United States Patent [19]

Sogo

[11] Patent Number: 5,768,316
[45] Date of Patent: Jun. 16, 1998

[54] MIXING CIRCUIT UTILIZING N INPUTS AND A NUMBER OF DECIMATION FILTERS THAT IS LESS THAN N

[75] Inventor: Akira Sogo, Hamamatsu, Japan

[73] Assignee: Yamaha Corporation, Hamamatsu, Japan

[21] Appl. No.: 608,957

[22] Filed: Feb. 29, 1996

Related U.S. Application Data

[63] Continuation of Ser. No. 199,454, Feb. 22, 1994, abandoned.

[30] Foreign Application Priority Data

Feb. 22, 1993 [JP] Japan ..................... 5-011752

[51] Int. Cl.$^6$ ........................................... H04K 1/10
[52] U.S. Cl. ..................... 375/260; 375/247; 370/537; 370/540
[58] Field of Search .............................. 375/247, 253, 375/254, 260, 276, 278; 341/123, 124, 141, 180; 370/232, 473, 478, 487, 490, 506, 537, 538, 540

[56] References Cited

U.S. PATENT DOCUMENTS

| | | | |
|---|---|---|---|
| 4,951,052 | 8/1990 | Jacob et al. ................. | 341/122 |
| 4,987,570 | 1/1991 | Almond et al. ............... | 370/84 |
| 5,541,582 | 7/1996 | Wagner et al. ............... | 370/537 |
| 5,627,536 | 5/1997 | Ramirez ....................... | 341/141 |

*Primary Examiner*—Edward L. Coles, Sr.
*Assistant Examiner*—Madeleine An Nguyen
*Attorney, Agent, or Firm*—Loeb & Loeb LLP

[57] ABSTRACT

A mixing circuit for synthesizing plural $\Delta\Sigma$ modulated data generated simultaneously with a bit rate F to single mixed data includes a slot determining section for dividing time length corresponding to 1-bit period of the $\Delta\Sigma$ modulated data into a number N which is of the same number as the plural $\Delta\Sigma$ modulated data, and a time division multiplex section for assigning in order the plural $\Delta\Sigma$ modulated data to the 1-bit period at a bit rate N*F on a time shared basis. The obtained mixed data can be converted to linear PCM data with a single decimation circuit. By increasing the bit rate of the mixed data by N times the bit rate F of the $\Delta\Sigma$ modulated data, a total gain can be maintained at a constant value irrespective of a change in the number of data to be synthesized.

16 Claims, 4 Drawing Sheets

(a) N=4

$$S = \frac{S1+S2+S3+S4}{4}$$

OUTPUT |S1|S2|S3|S4|S1|S2|S3|S4|······

$$S = \frac{S1+S2+S3}{4}$$

|S1|S2|S3|"0"|S1|S2|S3|"0"|······

$$S = \frac{2 \times S1 + 2 \times S2}{4} = \frac{S1+S2}{2}$$

|S1|S1|S2|S2|S1|S1|S2|S2|······

$$S = \frac{4 \times S1}{4} = S1$$

|S1|S1|S1|S1|S1|S1|S1|S1|······

FIG. 8(d)

MIXING CIRCUIT UTILIZING N INPUTS AND A NUMBER OF DECIMATION FILTERS THAT IS LESS THAN N

This is a continuation of application Ser. No. 08/199,454, filed Feb. 22, 1994, now abandoned.

BACKGROUND OF THE INVENTION

This invention relates to a mixing circuit for digitally synthesizing (adding or subtracting) plural $\Delta\Sigma$ modulated 1-bit stream data for plural input channels and for converting the $\Delta\Sigma$ modulated data to linear PCM data with a single-input decimation circuit.

A $\Delta$ modulator for requantizing a multi-bit digital signal to a 1-bit digital signal negative feeds back an integrated value of past output data to its input for comparing the integrated value with present input data and produces a binary signal one (1) or zero (0) depending upon whether a difference between the integrated value and the present input data is positive or negative and thereby renews the integrated value. The $\Delta$ modulated output assumes a code train as if input data was differentiated.

A $\Delta\Sigma$ modulator which is composed of this modulator and an integrator provided on the input side of the $\Delta$ modulator and thereby causes an integrated value of input data to be applied to the $\Delta$ modulator can improve the signal-to-noise ratio by shifting a noise component in a low frequency region to a high frequency region and therefore is useful for audio devices. The $\Delta$ modulator has its characterirstic feature in changing the spectrum distribution of a quantizing noise and hence is called a noise-shaping type modulator.

The output of the $\Delta\Sigma$ modulator is 1-bit stream data, e.g., PWM signal or PDM signal, and this output can be converted to a multi-bit linear PCM signal by inputting it to a decimation circuit. This output can also be converted to an analog signal by inputting it to a low-pass filter (LPF) having a digital-to-analog conversion function. A combined circuit having the modulator and an LPF is called a 1-bit DAC (digital-to-analog converter).

There is a case where plural sets of the above described $\Delta\Sigma$ modulators corresponding in number to plural signal channels are used. In this case, when it is necessary to synthesize 1-bit data of the respective sets of $\Delta\Sigma$ modulated data, this synthesizing processing is made after converting the plural $\Delta\Sigma$ modulated data to linear PCM signals by processing these $\Delta\Sigma$ modulated data simultaneously by separate decimation circuits or after converting the plural $\Delta\Sigma$ modulated data to analog signals by processing these $\Delta\Sigma$ modulated data simultaneously by separate 1-bit DACs.

The above described synthesizing method requires decimation circuits and 1-bit DACs of the same number as the number of signals to be inputted and to be synthesized (i.e., added or subtracted) with the result that the design of the mixing circuit becomes complex, that is, the area of the circuit (i.e. semiconductor chip) tends to become large. Besides, the above described synthesizing method requires a gain adjustment when the number of signals to be inputted and to be synthesized has changed.

It is, therefore, an object of the invention to provide a mixing circuit capable of converting plural $\Delta\Sigma$ modulated data to linear PCM data with a single-input decimation circuit by digitally time division multiplexing these $\Delta\Sigma$ modulated data.

SUMMARY OF THE INVENTION

For achieving the above described object of the invention, a mixing circuit for synthesizing plural $\Delta\Sigma$ modulated data generated simultaneously with a bit rate F to single mixed data has slot dividing means for dividing time length corresponding to 1-bit period of the $\Delta\Sigma$ modulated data into a number N which is of the same number as the plural $\Delta\Sigma$ modulated data, and time division multiplex means for assigning the plural modulated data to the 1-bit period at a bit rate N*F on a time shared basis.

According to the invention, plural $\Delta\Sigma$ modulated data can be converted to a multi-bit linear PCM signal with only a single-input decimation circuit by converting the plural $\Delta\Sigma$ modulated data to a single mixed signal by a time division multiplexing processing whereby the circuit design can be simplified. In this case, by increasing the bit rate of the mixed signal by N times the bit rate of $\Delta\Sigma$ modulated data to be synthesized, the gain is maintained at a constant value irrespective of a change in the number of data to be synthesized and, therefore, a gain adjustment becomes unnecessary.

Preferred embodiments of the invention will be described below with reference to the accompanying drawings.

BRIEF DESCRIPTION OF THE DRAWINGS

In the accompanying drawings,

FIG. 8 is a diagram showing another method of forming slots according to the invention.

DESCRIPTION OF PREFERRED EMBODIMENTS

Figure 1:
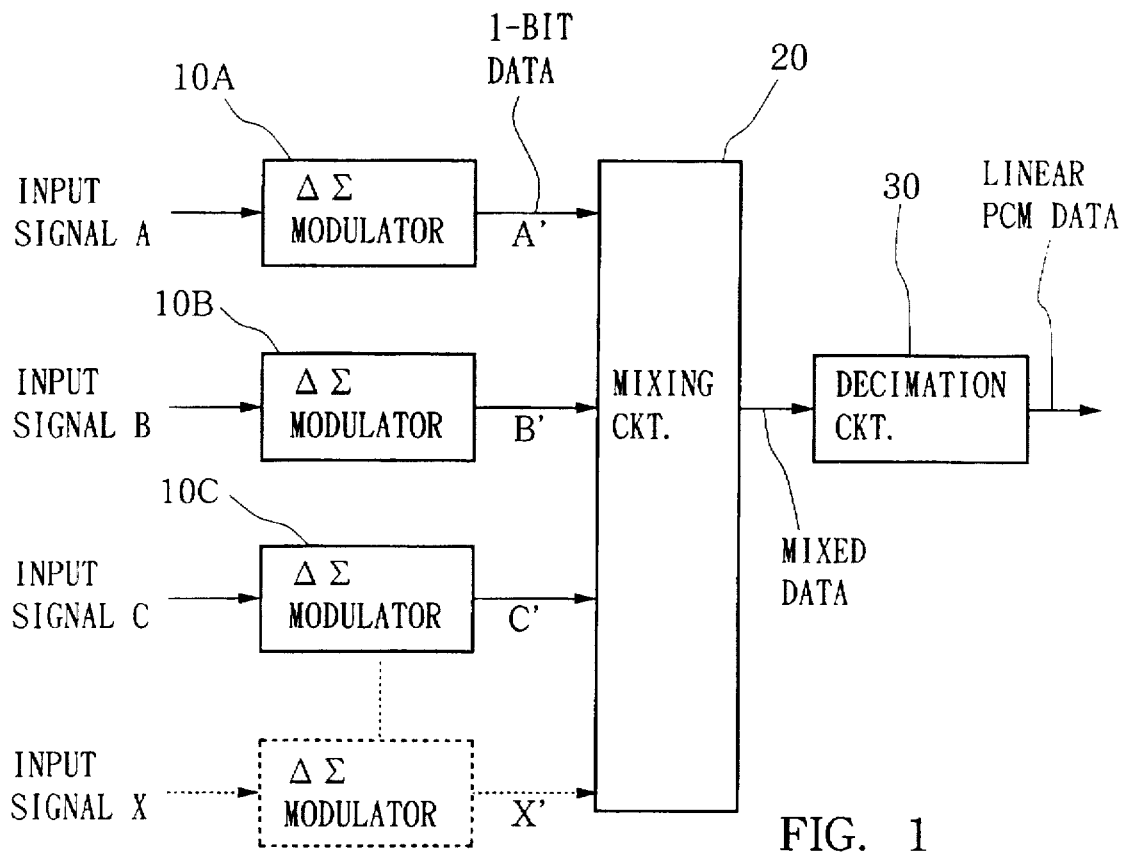
FIG. 1 is a block diagram showing an entire structure of a device incorporating a preferred embodiment of a mixing circuit made according to the invention.

Referring to FIG. 1, outputs A', B', C' of plural $\Delta\Sigma$ modulators 10A, 10B, 10C are synthesized to mixed data by a mixing circuit 20 on a time shared basis and this mixed data is converted by a decimation circuit 30 to linear PCM data. The $\Delta\Sigma$ modulators 10A, 10B, 10C perform a modulating operation independently from one another and thereby produce plural 1-bit data of different sources, i.e., the modulated data A', B', C'. It is assumed here that these data A', B', C' are all of the same bit rate F (bit per second).

Figure 2:
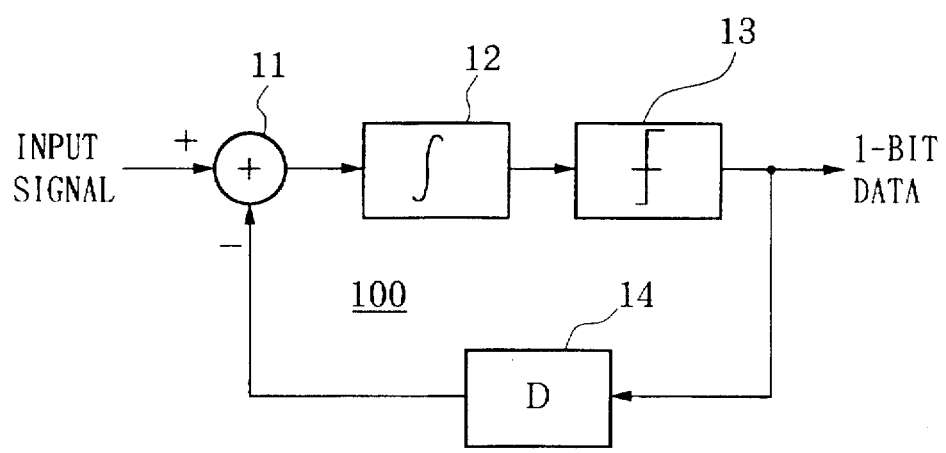
FIG. 2 is a block diagram showing a basic structure of a $\Delta\Sigma$ modulator.

The respective $\Delta\Sigma$ modulators, if it is a primary type modulator, have the basic structure shown in FIG. 2. A $\Delta\Sigma$ modulator 100 is constructed of a closed loop including an adder 11, an integrator 12, a comparator (1-bit quantizer) 13 and a 1-sample delay circuit 14. An input signal to the $\Delta\Sigma$ modulator 100 is applied to the adder 11 where the input signal is added to past output data which is negative fed back through the delay circuit 14. The output of the adder 11 is integrated by the integrator 12. The output of the integrator 12 is quantized by the comparator 13 and converted to a binary value of 1 or 0. The ouptut of the comparator 13 is supplied as 1-bit stream data to a post-stage circuit and also is fed back to the adder 11 through the delay circuit 14.

When the sign of the output value of the integrator 12 is positive, the ouptut of the comprator 13 is "0", and when the sign is negative, the ouptut of the comparator 13 is "1". To the adder 11 are applied an input multi-bit digital signal A, B or C as shown in FIG. 1 and an inverted output signal of the delay circuit 14 while and, when the output of the delay circuit 14 is "0", a maximum positive value corresponding to the multi-bit digital signal is actually applied to the adder 11 whereas, when the output of the delay circuit 14 is "1", a maximum negative value corresponding to the multi-bit digital signal is applied to the adder 11.

Figure 3:
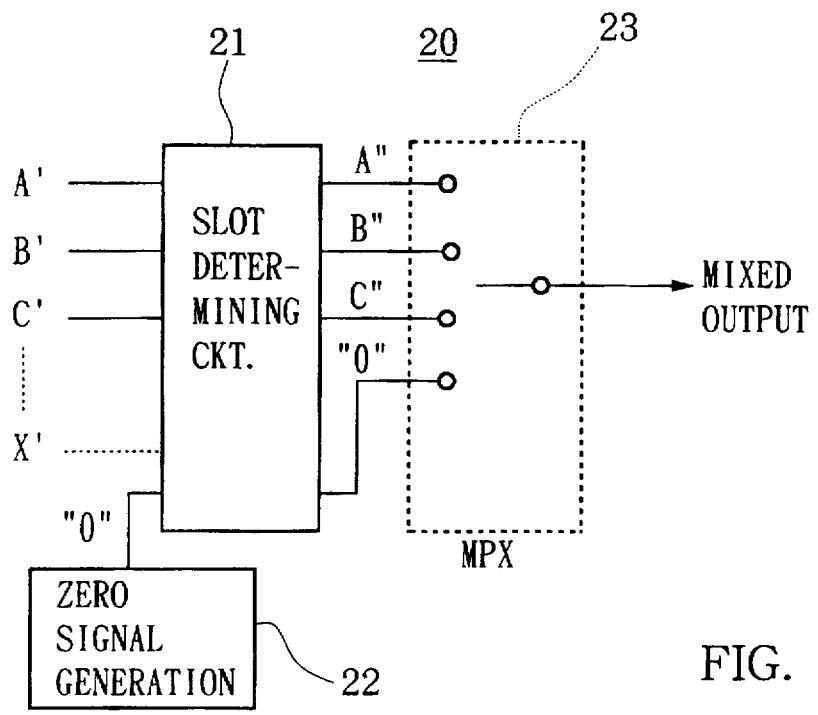
FIG. 3 is block diagram showing the embodiment of the mixing circuit.

FIG. 3 schematically shows the structure of a preferred embodiment of the mixing circuit made according to the invention. In FIG. 3, reference character 21 denotes a slot dividing circuit, 22 a zero signal generation circuit and 23 a multiplexer (MPX) having a function as a time division signal generation function and a multiplexing function.

The slot determining circuit 21 establishes time division multiplex of a predetermined number which is equal to or greater than a number n of input 1-bit signals to be synthesized, in accordance with the number of plural input 1-bit signal to be synthesized. The zero signal generation section 22 generates a zero signal "0" having a predetermined bit pattern (e.g., duty cycle of 50%). The MPX 23 selects or receives, on a time shared (divided) basis, the 1-bit data A', B', C' at a bit rate N*F which is N-fold of the bit rate F(bps) of the input 1-bit data on the basis of the slot number N determined by the slot determining circuit 21 and further synthesizes, i.e., multiplexes, the plural input 1-bit data on the time base. In this case, when the slot dividing number N is larger than the number n of input signals to be synthesized, multiplexing is performed in such a manner that the zero signal "0" will be inserted to superfluous slots. The zero signal "0" is invalid data for post-stage circuit.

Figure 4:
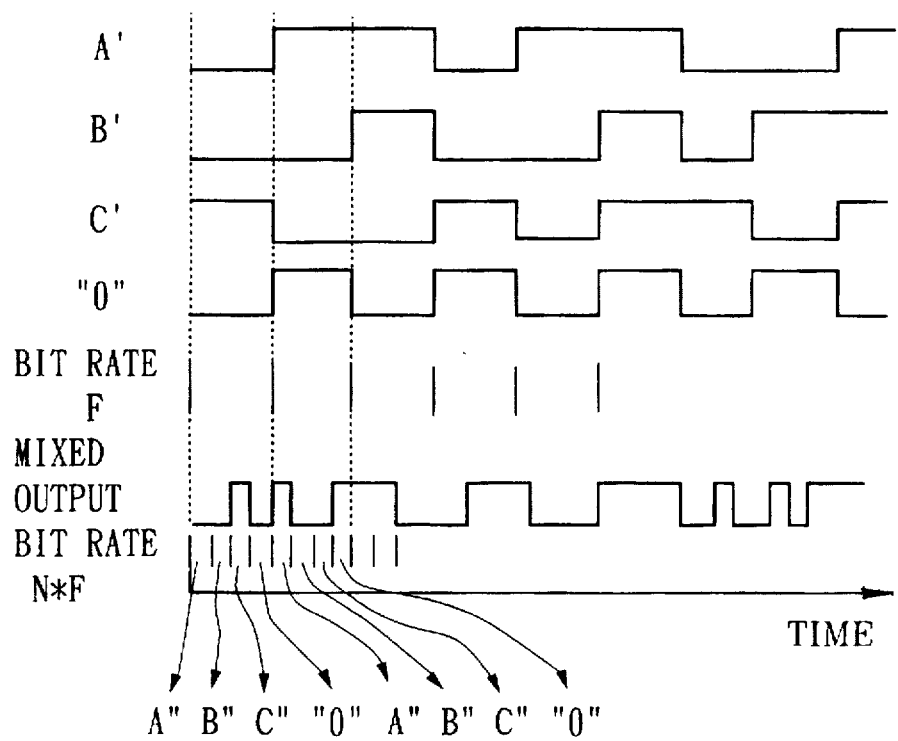
FIG. 4 is a waveform diagram showing a circuit operation of the circuit of FIG. 3.

FIG. 4 is a waveform diagram showing a case where, when the slot number N is 4, the signals A', B' and C' of a number n=3 which is smaller than N are synthesized. The respective bit rate of the original signals A', B' and C' to be synthesized and the zero signal "0" is F (bps) and these signals are synthesized on a time shared basis at the bit rate N*F (bps) which is N times as large as the bit rate F (bps) to form a single mixed output. The pattern of the zero signal "0" of this example is duty cycle 50%. Subtraction during mixing of the plural signal can be made in a simple manner because it can be achieved by synthesizing the NOT condition of the signals A', B' and C' to subtract.

The slot determining circuit 21 determines the slot number of the time division multiplex so that the slot number N will becomes 4. The MPX 23 receives the signals A", B" and C" in order at the bit rate N*F and multiplexes them. When the number of input channels n to the multiplexer 23 is 3 and the slot number N is 4, there is one superfluous input channel to the MPX. The MPX 23 receives "0" for this superfluous input channel at the bit rate N*F. Since the bit rate of a mixed (synthesized) signal produced in this manner is N-fold that of the original signal A (or B or C) to be synthesized, energy of each original signal inserted in each input channel becomes 1/N and, accordingly, if the zero signal is synthesized, the total gain after synthesizing remains unchanged compared with the respective input signals. Therefore, it is unnecessary to adjust the gain after mixing. When the number n of the signals is 3 and the slot dividing number N is the same number 3, no superfluous input channel is produced so that it is not necessary to insert "0".

The decimation circuit 30 is used for converting the mixed (time dividing multiplex) signal which is synthesized in the above described manner to multi-bit low bit-rate linear PCM data.

Figure 5:
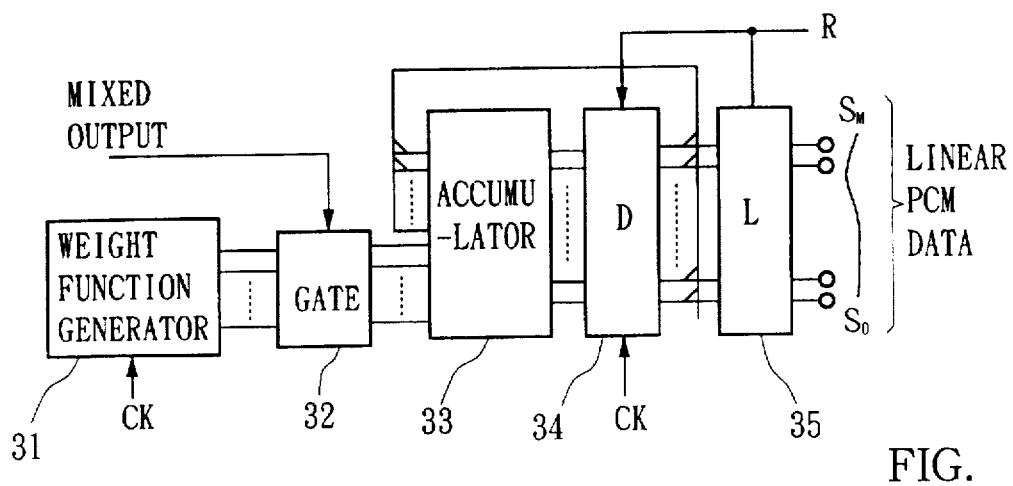
FIG. 5 is a block diagram showing an example of a general decimation circuit.

In FIG. 5 which shows a structure of a decimation circuit of the invention, reference character 31 denotes a weight function generator which generates a weight function consisting of, e.g., a bartlett function or the Blackman-Harris function in which the amount of attenuation at the secondary pole is larger than in a bartlett function as disclosed in Japanese Preliminary Utility Model Application Laid-Open No. Sho 63-99436. The output of this weight function generator 31 is supplied to a gate group 32 in synchronism with a high rate clock CK.

The gate group 32 has, e.g., plural AND gates or EXOR gates or EXNOR gates (disclosed in Japanese Utility Model Publication No. Hei 4-30832). In a case where the gate group 32 has AND gates, a weight function is gated out when the mixed signal from the mixing circuit 20 is "1" and the gate output is forced to become "0" when the mixed signal is "0". The output of the gate group 32 is accumulated for each predetermined period through a feedback loop including an accumulator 33 and a delay section 34 and parallel data of the delay section 34 as the accumulated value constitute multi-bit linear PCM data SM to S0. The period of accumulation in the delay section 34, signal latch period in a latch circuit 35 and period of weight function generation in the weight function generator 31 are all determined by the period of a reset signal R.

Figure 6:
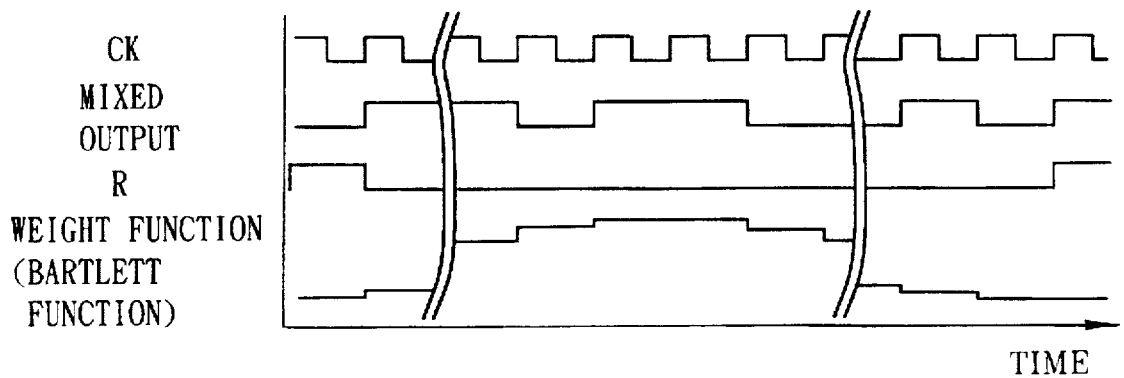
FIG. 6 is a waveform diagram showing a circuit operation of the decimation circuit of FIG. 5.

FIG. 6 is a signal waveform diagram showing waveforms when the slot number N is 1. In this case, the bit rate F of the original signals is the same as the bit rate N*F of the mixed signal.

Figure 7:
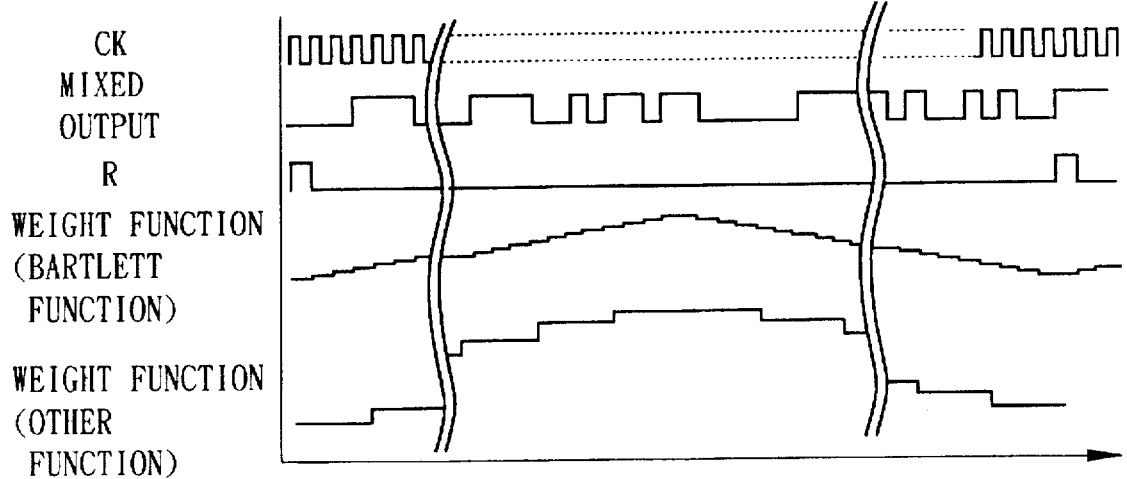
FIG. 7 is a waveform diagram showing another circuit operation of the decimation circuit of FIG. 5.

FIG. 7 is a signal waveform diagram showing waveforms when the slot number N is 4. In this case, the bit rate N*F of the mixed signal becomes four times as large as the bit rate F of the original signals.

Comparing FIG. 6 with FIG. 7, it will be understood that, in the case shown in FIG. 6, the rate of the clock CK becomes higher as the slot number increases so that the number of steps of approximate change of the weight function (step-wise change) increases but the period of the reset signal R remains unchanged.

In FIG. 7, resolution (both time and amplitude) of the weight function is shown as an increasing one but it may be a weight function of a waveform which is similar to the waveform shown in FIG. 6.

In the above description made with reference to FIG. 3, the example of inserting zero signal "0" in a superfluous slot has been described. Alternatively, assignment of data may be made as shown in FIG. 8. Referring to FIG. 8, the decimation circuit 30 is of a fixed construction corresponding to a fixed number N which is, for example, 4 and generates a clock CK, a reset signal R and a weight function. When the time division multiplex has been performed by using the slot number N=4 by the mixing circuit 20, four signals S1–S4 are simply synthesized together on a time divided basis as shown in (a) of FIG. 8. When the slot has been formed by using the dividing number N=3, there arises one superfluous slot after inserting the signals S1 to S3, so that "0" is inserted in the superfluous slot as shown in (b) of FIG. 8.

When the time division multiplex has been performed by using the slot number N=2, there arise two superfluous input channels and, in this case, the signals S1 and S2 are respectively inserted twice consecutively as shown in (c) in FIG. 8 so as to avoid generation of a superfluous input channel in which "0" should be inserted. When the slot is formed by using the slot number N=1, there arise three superfluous input channels and, in this case, the signal S1 is inserted four times consecutively as shown in (d) of FIG. 8 so as to avoid generation of a superfluous input channel in which "0" should be inserted.

According to this time dividing multiplex method, a change in a gain for each individual signal is made simultaneously with a change in the number of signals to be synthesized and, therefore, no special gain adjustment is required. Alternatively stated, in the case of FIG. 8, an average signal energy S is the same for all cases except when N is 3 and, therefore, a gain adjustment between them is unnecessary.

The decimation circuit 30 is constructed either by changing its operation frequency and weight function section in accordance with the number of $\Delta\Sigma$ modulated data to be synthesized or by determining an upper limit of the number of $\Delta\Sigma$ modulated data to be synthesized and determining its operation frequency and weight function section in accordance with the upper limit number. In the latter case, the slot dividing method as shown in FIG. 8 is employed.

What is claimed is:

1. A mixing circuit for synthesizing a number of plural undecimated $\Delta\Sigma$ modulated data generated simultaneously with a bit rate F into a single undecimated mixed data stream, the circuit comprising:

slot determining means having a plurality of inputs for receiving the plural undecimated $\Delta\Sigma$ modulated data and for dividing a length of time corresponding to a 1-bit period of the undecimated $\Delta\Sigma$ modulated data into a number N which equals the number of plural undecimated $\Delta\Sigma$ modulated data; and time division multiplex means for assigning in order, the number of plural undecimated $\Delta\Sigma$ modulated data to the 1-bit period at a bit rate N*F on a time shared basis to output the single undecimated mixed data stream for later decimation.

2. A mixing circuit as defined in claim 1, wherein said slot determining means is capable of changing the number N of the slots into which the length of time is divided in accordance with a change in the number of the plural undecimated $\Delta\Sigma$ modulated data such that a gain of the circuit is maintained.

3. A mixing circuit as defined in claim 1, further comprising a single decimation circuit for receiving the single undecimated mixed data stream and for converting the single undecimated mixed data stream to linear PCM data.

4. A mixing circuit as defined in claim 1, further comprising a single decimation circuit which includes a weight function generation section and is capable of changing an operation frequency thereof and the weight function generation section in accordance with the number of plural undecimated $\Delta\Sigma$ modulated data to be synthesized, said decimation circuit converting the single undecimated mixed data stream to linear PCM data.

5. A mixing circuit as defined in claim 1, further comprising a number of decimation circuits less than the number of plural undecimated $\Delta\Sigma$ modulated data for receiving and converting the single mixed data stream to linear PCM data.

6. A mixing circuit for synthesizing a number of plural undecimated $\Delta\Sigma$ modulated data generated simultaneously with a bit rate F to a single undecimated mixed data stream, the circuit comprising:

slot determining means having a plurality of inputs for receiving the plural undecimated $\Delta\Sigma$ modulated data and for dividing a length of time corresponding to a 1-bit period of the $\Delta\Sigma$ modulated data into a number N which is equal to or greater than the number of plural undecimated $\Delta\Sigma$ modulated data;

zero signal generation means for generating a zero signal of a predetermined pattern; and time division multiplex means for assigning the number of plural undecimated $\Delta\Sigma$ modulated data and the zero signal to the 1-bit period at a bit rate N*F on a time shared basis to output the single undecimated mixed data stream for later decimation.

7. A mixing circuit as defined in claim 6, further comprising a single decimation circuit which includes a weight function generation section and is capable of determining an operation frequency thereof and the weight function generation section in accordance with a predetermined upper limit of the number of plural undecimated $\Delta\Sigma$ modulated data to be synthesized.

8. A mixing circuit as defined in claim 3, wherein said time division signal generation means has, in addition to a mode for assigning the zero signal, a mode for assigning the each of the plural undecimated $\Delta\Sigma$ modulated data continuously to plural slots when the number of the plural undecimated $\Delta\Sigma$ modulated data to be assigned is smaller than the number N.

9. An apparatus for mixing and converting a plurality of input signals, the apparatus comprising:

a plurality $\Delta\Sigma$ modulator circuits, each having an output;

a mixing circuit having a plurality of inputs, each input being connected to a different one of the outputs of each of the plurality of $\Delta\Sigma$ modulators to produce a single mixed data stream at an output of the mixing circuit; and a single decimation circuit coupled to the output of the mixing circuit for receiving and converting the single mixed data stream to a decimated data stream.

10. An apparatus for mixing and converting a plurality of input signals, the apparatus comprising:

a plurality of $\Delta\Sigma$ modulator circuits, each having an output:

a mixing circuit having a plurality of inputs, each input being connected to a different one of the outputs of each of the plurality of $\Delta\Sigma$ modulator circuits to produce a single mixed data stream at an output of the mixing circuit: and a single decimation circuit coupled to the output of the mixing circuit for receiving and converting the single mixed data stream to a decimated data stream:

wherein $\Delta\Sigma$ modulated data from the plurality of $\Delta\Sigma$ modulator circuits is generated at a bit rate F, and wherein the mixing circuit includes:

a slot determining circuit that divides a length of time corresponding to a 1-bit period of the $\Delta\Sigma$ modulated data into a number N which equals a number corresponding to the plurality of $\Delta\Sigma$ modulator circuits; and a time division multiplex circuit that assigns the outputs of the plurality of $\Delta\Sigma$ modulator circuits to the 1-bit period at a bit rate N*F on a time shared basis to produce the single mixed data stream prior to decimation.

11. An apparatus according to claim 10, wherein the slot determining circuit is capable of changing the number N of the slots into which the length of time is divided in accordance with a change in the number of the plurality of $\Delta\Sigma$ modulator circuits such that a gain of the circuit is maintained.

12. An apparatus according to claim 9, wherein the single decimation circuit converts the single mixed data stream to linear PCM data.

13. An apparatus according to claim 9, wherein the single decimation circuit includes a weight function generation section, wherein the mixing circuit is capable of changing an operation frequency thereof and the weight function generation section in accordance with the number of ΔΣ modulated data to be synthesized, and wherein the decimation circuit converts the single mixed data stream to linear PCM data.

14. An apparatus for mixing and converting a plurality of input signals, the apparatus comprising:

a plurality of ΔΣ modulator circuits, each having an output;

a mixing circuit having a plurality of inputs, each input being connected to a different one of the outputs of each of the plurality of ΔΣ modulator circuits to produce a single mixed data stream at an output of the mixing circuit, and a single decimation circuit coupled to the output of the mixing circuit for receiving and converting the single mixed data stream to a decimated data stream, wherein ΔΣ modulated data from the plurality of ΔΣ modulator circuits is generated at a bit rate F, and wherein the mixing circuit includes:

a slot determining circuit that divides a length of time corresponding to a 1-bit period of the ΔΣ modulated data into a number N which is equal to or greater than a number corresponding to the plurality of ΔΣ modulator circuits;

a zero signal generation circuit that generates a zero signal of a predetermined pattern; and a time division multiplex circuit that assigns the outputs of the plurality of ΔΣ modulator circuits and the zero signal to the 1-bit period at a bit rate N*F on a time shared basis to produce the single mixed data stream prior to decimation.

15. An apparatus according to claim 14, wherein the single decimation circuit includes a weight function generation section, wherein the mixing circuit is capable of determining an operation frequency thereof and the weight function generation section in accordance with a predetermined upper limit of the number of plural ΔΣ modulated data to be synthesized.

16. An apparatus according to claim 14, wherein the time division multiplex circuit has, in addition to a mode for assigning the zero signal, a mode for assigning each of the plural ΔΣ modulated data continuously to plural slots when the number of the plural ΔΣ modulated data to be assigned is smaller than the number N.

* * * * *